United States Patent
Glaspy, Jr.

(10) Patent No.: US 6,498,610 B1
(45) Date of Patent: Dec. 24, 2002

(54) CONCURRENT UTILIZATION OF MULTIPLE COLOR PROFILE DATABASES FOR IMAGE RENDING

(75) Inventor: Jay A. Glaspy, Jr., Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/565,106

(22) Filed: May 5, 2000

(51) Int. Cl.[7] .............................. G06T 11/40; G09G 5/02
(52) U.S. Cl. ........................ 345/603; 345/771; 345/600; 345/966; 358/523; 358/504
(58) Field of Search ................................ 345/603, 604, 345/771, 966, 600, 589, 581, 593, 594, 590; 358/1.9, 501, 504, 523, 539; 707/104.1, 528, 526

(56) References Cited

U.S. PATENT DOCUMENTS

| | | | | |
|---|---|---|---|---|
| 4,648,046 A | * | 3/1987 | Copenhaver et al. | 345/589 |
| 5,760,913 A | * | 6/1998 | Falk | 358/504 X |
| 5,881,209 A | * | 3/1999 | Stokes | 358/1.9 |
| 6,037,950 A | * | 3/2000 | Meir et al. | 345/589 X |
| 6,088,038 A | * | 7/2000 | Edge et al. | 345/600 |
| 6,128,415 A | * | 10/2000 | Hultgren, III et al. | 345/600 X |
| 6,307,961 B1 | * | 10/2001 | Balonon-Rosen et al. | 345/600 X |

OTHER PUBLICATIONS

International Color Consortium®—Specification ICC.1:1998–09 / *File Format for Color Profiles.*

* cited by examiner

*Primary Examiner*—Raymond J. Bayerl
(74) *Attorney, Agent, or Firm*—Fay, Sharpe, Fagan, Minnich & McKee, LLP

(57) ABSTRACT

Provided is a device that allows a DFE decomposer supported for a particular format, such as ICC profile formats, to utilize multiple transformation databases concurrently. For each database, a software plug-in is created to interpret the specific format of particular databases. The plug-ins convert the contents of the third party database into a common structure understood by a decomposer of a digital front end (DFE). The plug-in interface includes data (i.e. structures) and behavior (i.e. methods) supported by all plug-ins. A plug-in for a supported database (i.e. ICC profile formats) is also provided. An interface between a color control manager and decomposer module is used to inform the decomposer of changes to the supported database. An appropriate plug-in may then retrieve data and update an internal database of the decomposer while the system is operating. Updatings of third party databases occur upon initialization of the system.

9 Claims, 2 Drawing Sheets

CONCURRENT UTILIZATION OF MULTIPLE COLOR PROFILE DATABASES FOR IMAGE RENDING

BACKGROUND OF THE INVENTION

In the field of image rendering, there are a number of different formats in which an image and the color space transformation of that image may be represented. One specific type of format is defined by the International Color Consortium (ICC) (International Color Consortium is a registered trademark of the International Color Consortium). The ICC is directed to generation of an image profile format specification which allows for a cross-platform device profile format. Such profiles can be used to translate color data created in one device into another device's native color space. The use of a standardized profile format by operating system vendors allows end users to transparently move profiles and images with embedded profiles between different operating systems. For example, device profiles provide color management systems with the information necessary to convert color data between native device color spaces and device-independent color spaces.

The ICC specification divides color devices into three broad classifications: input devices, display devices and output devices. For each device class, a series of base algorithmic models are described which perform the transformation between color spaces. These models provide a range of color quality and performance results. The necessary parameter data to implement these models is described in the required portions on the appropriate device profile descriptions. The profile structure is defined as a header followed by a tag table followed by a series of tagged elements that can be accessed randomly and individually.

As noted above, in addition to the ICC profile format, device specific and/or company specific formats have also been developed, and it is anticipated that other unique formats may be developed in the future.

When the image-rendering technology used in a digital front end (DFE) of a image-rendering device receives image formats supported by the device (such as ICC formats), then communication as to image profiles are understandable by components of the device. However when an image to be rendered is obtained from a third party, the image-rendering component may have its own representation of a color space transformation database, possibly for use on products other than those supported by the image-rendering device. Thus, the color space transformation profile format used by the third party may differ from a profile supported by a DFE of the image-rendering device which is to generate the image. However, the profile information used by the third party may be considered useful. In other words, it may be desirable for two or more databases providing the same type of information but in different formats to function with a single image rendering device.

It is therefore desirable to construct an image-rendering device having a digital front end (DFE) that includes the capability to easily manage color imaging resources, where management activities include loading, deleting, replacing and associating color profiles, and where the DFE supports different profile formats.

SUMMARY OF THE INVENTION

The present invention provides a design that allows a DFE decomposer supported for a particular format, such as ICC profile formats, to utilize multiple transformation databases concurrently. For each database, a software component referred to as a plug-in is created to deal with the specifics of the particular database. The plug-ins convert the contents of the third party database into a common structure understood by the decomposer. The invention defines the plug-in interface including data (i.e. structures) and behavior (i.e. methods) supported by all plug-ins. A plug-in for a supported database is also provided. An interface is used to inform the decomposer of changes to the supported database whereby the plug-in may retrieve data and update an internal database of the decomposer while the system is operating. Updatings of third party databases occur upon initialization of the system.

DETAILED DESCRIPTION OF THE PREFERRED EMBODIMENT

In the present invention, a DFE has been configured as a Unix application that runs on an open Unix platform (for example a Sun Sparc system). The DFE supports an ICC profile management mechanism that includes its own representation of an ICC profile database. An ICC profile is an industry standard that describes a format for representing color space transformations. Running on an open platform and supporting an industry standard color space translation file format creates an opportunity for the existence of many implementations of ICC profile databases. In the present invention, if a third party database becomes available, the DFE leverages the transformation provided by the database while concurrently supporting its own database.

Thus, the present invention is designed to allow a DFE decomposer to utilize multiple color transformation databases concurrently. For each database, a software plug-in component is created to interact with the specifics of a particular third party database. The plug-ins convert the contents of a third party database into a common structure understood by the system decomposer. In the present invention, a plug-in interface is defined to include data (i.e. structures) and behavior (i.e. methods) supported by all plug-ins.

Figure 1:
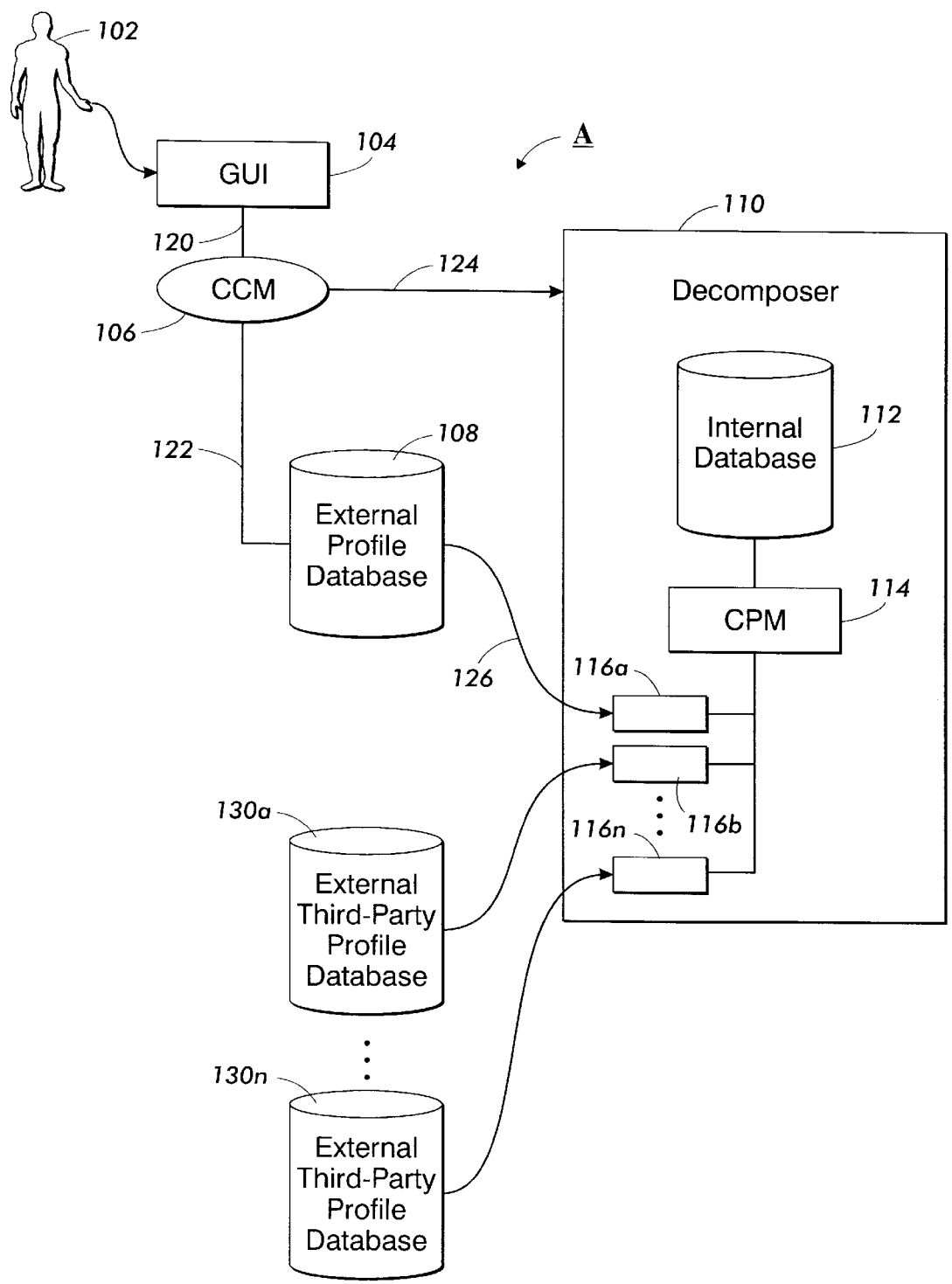
FIG. 1 details an illustration regarding the operation of the decomposer and plug-ins according to use with a supported database and third-party databases according to the present invention.

Turning to FIG. 1, in an image-rendering device A, shown are selected components of a digital front end. A user 102 will interact with a graphical user interface (GUI) 104 to communicate with the image-rendering device A in order to select parameters by which images will be generated. The graphical user interface (GUI) 104 supplies information to a color-collection manager 106. The color-collection manager is in communication with a system external profile database (EPD) 108 and a decomposer module 110. The decomposer module 110, includes an internal database 112, a color profile manager 114 and plug-ins 116a–116n.

Document decomposition is the process of interpreting an electronic representation of a document and producing a simpler format to drive the print engine, or marker (not shown). Typically, the document is submitted to the decomposer in a page-description language (PDL), and the decomposition process converts it to raster format.

The conversion process can vary in complexity depending on the complexity of the job. For black and white documents, this may be as simple as converting the document into a matrix of white and black dots, where each dot is represented by a single binary digit (1 or 0).

Conversion of color images is on the other end of the complexity spectrum. Because color images combine cyan, magenta, yellow and black dots to generate colors, each dot must be represented by several binary digits instead of a single digit. In addition, color image processing often includes several additional steps such as anti-aliasing, overlaying and trapping.

Many of the steps in the image-processing procedure are undertaken in accordance with the image profile format associated with the image to be rendered. The color profile manager 114 uses the ICC profile format information during the decomposition process.

As the operator 102 interacts with the graphical user interface 104, assignments and actions are created and loaded to the color collection manager 106 (120). All information on the assignments, etc. are then sent to and stored in database 108 (122). Color collection manager 106, manages the system's external profile database, and also notifies decomposer module 110 that changes are being made to database 108 (124).

It is to be noted that internal database 112, upon initialization, reads all information and files on database 108. Therefore, upon start-up of the image-rendering device A, information stored on database 108 is stored to internal database 112 of decomposer 110. During operation, as previously discussed, when an assignment, change or addition is made to database 108 via color collection manager 106, decomposer module 110 is notified. Database 108 stores the image profiles such as ICC profile formats within database 108. This information upon initialization is therefore available (i.e. the profiles) to the decomposer 110 to allow for appropriate image processing.

When changes to profiles on database 108 are made, and color collection manager 106 has notified decomposer 110 of such changes, the decomposer module 110 will then communicate with database 108 to obtain the changes (126), in order to synchronize the internal database 112 of the decomposer 110 with the data on database 108. Such transfer of information may be undertaken by use of a plug-in 116a designed to understand and communicate with database 108. Such updating and notification processes may take place dynamically without the requirement of restarting and reinitializing the device A.

Plug-in 116a is loaded dynamically during initialization of the system. When the decomposer module 110 starts up, the color profile manager 114 has been modified to look in a particular location and start up one or more of plug-ins 116a–116n. While color profile manager 114 has other functions in the image rendering process, with attention to the plug-ins, the color profile manager 114 receives data from a plug-in 116a–116n and stores that data in internal database 112.

While database 108 uses a profile format supported by device A, it is also desirable that rendering device A, be capable of receiving and interacting with non-supported image information held on third-party external profile databases 130a–130n. Therefore the present invention is designed to have multiple plug-ins 116b–116n where each plug-in is designed to understand the format of data on the respective database 130a–130n.

However, whereas external profile database 108, which is part of and supported by rendering device A, will interface for example between color collection manager 106 and decomposer 110 which allows for notification of changes to database 108, the same is not available for the third-party external profile databases 130a–130n. Particularly, while rendering device A may be aware of the existence of databases 130a–130n and their formats, device A does not control these databases and therefore does not have an interface which is aware of changes to the database in an ongoing dynamic manner. Thus, it is not possible for the internal database 112 of decomposer 110 to be updated while the system is operational. Rather, each time the decomposer 110 is initialized, decomposer 110 will, through plug-ins 116b–116n read the contents of databases 130a–130n and obtain any updated changes to these databases.

Thus, in conformance with the present invention, when a change to supported database 108 occurs, a dynamic message for such change is provided to the decomposer 110 which then uses a plug-in 116a to obtain those changes while the system is operating. Particularly, plug-in 116a is designed to obtain the changes made to database 108 whereby the color profile manager 114 can then update internal database 112 of decomposer 110, such updating taking place at job boundaries.

The plug-ins 116b–116n are configured in accordance with the design of the third-party databases to which they will be associated. Commonly, plug-ins are used for purposes of obtaining third-party information from whatever source and reformatting it into a format usable by a target system. Thus, the plug-ins simply extract data in a non-supported format and translate the information so it may be used in a system using a supported format, by using a plug-in which knows how to read and write the data from the third party database. To the target system, the data is simply information in a format appropriate for the target system.

Figure 2:
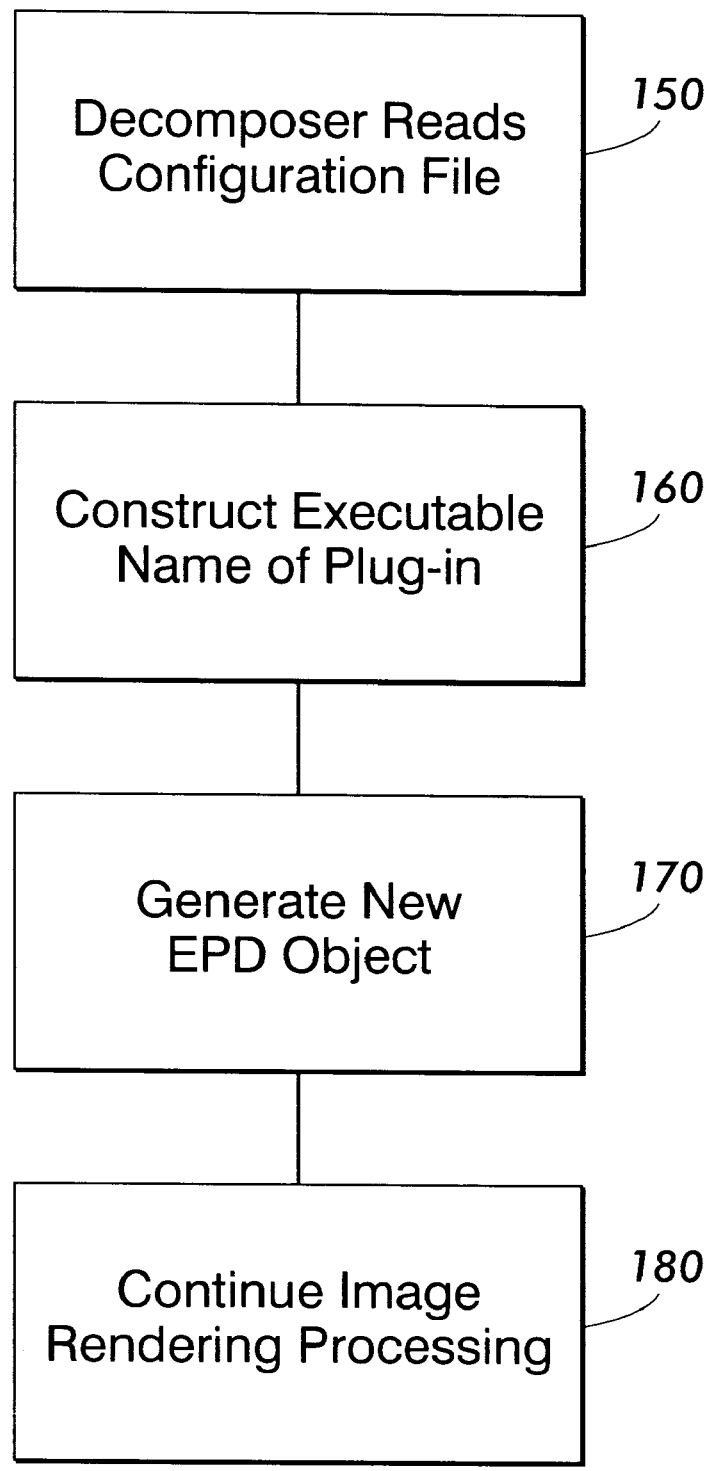
FIG. 2 depicts a flowchart of the operation in accordance with the present invention.

As shown in FIG. 2, the process of the present invention involves defining a database abstraction defined as an external profile database (EPD) object.

The object abstracts the specifics of a particular database for the decomposer. In this way the decomposer is dealing with an external profile database object, and is not concerned with the specifics of the database. Such an object is achieved by use of one of the plug-ins of the decomposer.

A decomposer first reads a configuration file to determine which of the profile databases must be used to accomplish a requested task 150. Upon determining the profile database which is to be used, the name of the database is used by the decomposer to construct the executable name of the plug-in 160. For example, if a profile database name is "ccprof", the plug-in name may be "libccprof.so".

Next, once the executable name of the plug-in has been constructed, the decomposer then creates a new EPD object 170. The new EPD object contains data and function pointers that completely encapsulate the state of the opened or selected profile database. Since the global state about each particular database is not maintained, the decomposer can create as many EPD objects as there are profile databases to read. The functions in each EPD object are dynamically bound, during the create operation, to the plug-in responsible for handling the database. The interface to the decomposer for all EPD objects is the same. Therefore, the decomposer can reuse its implementation. Furthermore, the information passed to the decomposer when a next function is requested (e.g. when the EPD>getNextEntry function) is called is the same for all EPD objects. In effect, each EPD object hides the detail of the profile database from the decomposer, mapping database specific information to a common interface understood by the decomposer. With the new EPD object, the present invention will then continue with the image-rendering process 180.

Thus, the present invention provides a design that allows a DFE decomposer supported for a particular format, such as ICC profile formats, to utilize multiple transformation databases concurrently. For each database, a software component referred to as a plug-in is created to deal with the specifics of the particular database. The plug-ins convert the contents of the third party database into a common structure understood by the decomposer. The invention defines the plug-in interface including data (i.e. structures) and behavior (i.e. methods) supported by all plug-ins. A plug-in for a supported database is also provided. An interface is used to inform the decomposer of changes to the supported database whereby the plug-in may retrieve data and update an internal database of the decomposer while the system is operating. Updatings of third party databases occur upon initialization of the system.

Having thus described the invention, it is now claimed:

1. A digital front end of a image-rendering device comprising:
    a graphical user interface through which a user inputs desired operations;
    a color collection manager configured to receive information from the graphical user interface;
    a device profile database which stores a plurality of image profiles corresponding to images to be rendered, the profile database storing data in a format supported by the digital front end;
    a third party profile database which stores a plurality of image profiles corresponding to images to be rendered, the third party database storing data in a format other than that supported by the digital front end; and
    a decomposer configured to decompose image data of an image to be rendered, the decomposer including a color profile manager, a decomposer database and a plurality of plug-ins,
    wherein the color collection manager has an interface to the decomposer to notify the decomposer of a change being made to the device profile database,
    wherein one of the plug-ins are activated to obtain the changes to the device profile database and store the changes on the decomposer database, and
    wherein when information is requested from a third party profile database, another one of the plurality of plug-ins is activated to obtain, reformat and supply the requested information to the decomposer.

2. The invention according to claim 1, wherein the profile format stored on the device profile database is an International Color Consortium format.

3. The invention according to claim 1 wherein the third party plug-in converts the contents of the third party database into a structure understood by the decomposer.

4. The invention according to claim 1 wherein the decomposer database is updated with changes to the device database while the image-rendering device is operational.

5. A method of generating a database abstraction by a digital front-end of an image-rendering device, the method comprising:
    reading, by a decomposer of the digital front end, a configuration file to determine which profile database of a plurality of profile databases are to be used;
    constructing an executable name of a plug-in module, by the decomposer, using the name of the profile database obtained in the reading step;
    creating, by the decomposer, a new external profile database object, wherein the EPD object contains data and function points that encapsulate a state of the selected profile database.

6. The method according to claim 5 wherein a global state of any particular database is not maintained.

7. The method according to claim 6 wherein the decomposer creates as many EPD objects as there are profile databases to read.

8. The method according to claim 5 wherein the function points in each EPD object are dynamically bound, during the create operation, to the plug-in responsible for handling the selected profile database.

9. The method according to claim 5 wherein an interface to the decomposer for all EPD objects is the same, whereby the decomposer can be reused.

* * * * *